No. 859,996. PATENTED JULY 16, 1907.
A. VAN FLEET.
LIFTING JACK.
APPLICATION FILED JUNE 29, 1906.
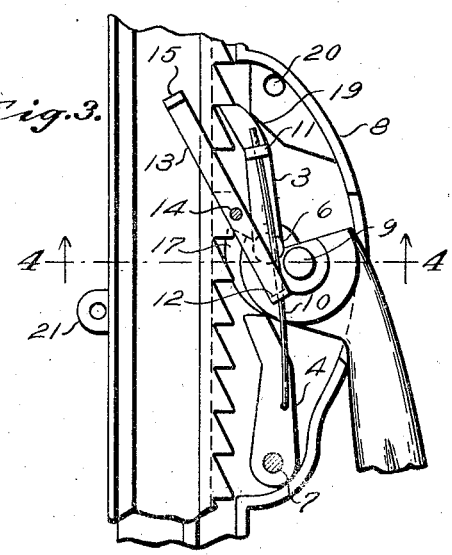
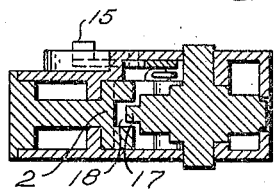
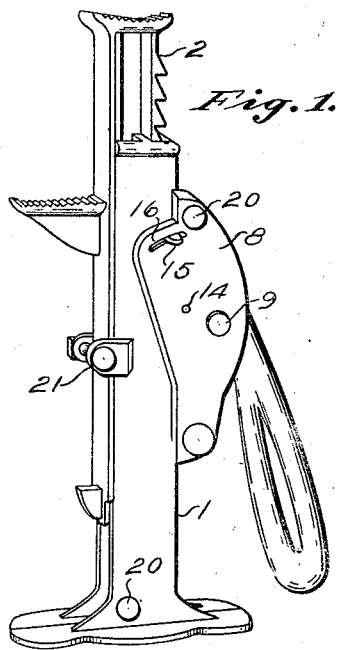
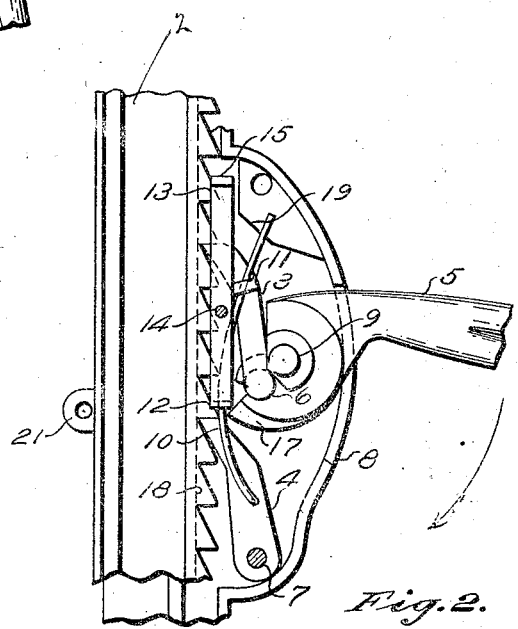
Witnesses: Inventor,
Alfred Van Fleet
by Rummler & Rummler
Attorneys.

UNITED STATES PATENT OFFICE.

ALFRED VAN FLEET, OF JOLIET, ILLINOIS, ASSIGNOR TO WILLIAM E. PRATT, OF CHICAGO, ILLINOIS.

LIFTING-JACK.

No. 859,996.　　　　　Specification of Letters Patent.　　　Patented July 16, 1907.

Application filed June 29, 1906. Serial No. 324,030.

*To all whom it may concern:*

Be it known that I, ALFRED VAN FLEET, a citizen of the United States of America, and a resident of Joliet, in the county of Will and State of Illinois, have invented certain new and useful Improvements in Lifting-Jacks, of which the following is a specification.

The main object of this invention is to provide an improved and simple form of lifting jack of the pawl and rack type, in which the action of the parts may be adjusted so that the rack may be raised or lowered by a similar movement of the lever, and to provide for compactness of structure, and an improved arrangement of the cam for urging the pawl into engagement with the rack. This object is accomplished by the mechanism shown in the accompanying drawings, in which:

Figure 1 is a side elevation of a lifting jack constructed according to this invention. Fig. 2 is a partly sectional view of the operating mechanism within the lever casing, showing the parts adjusted for raising the rack. Fig. 3 is a similar view showing the parts adjusted for lowering the rack. Fig. 4 is a horizontal section on the line 4—4 of Fig. 3.

In the device shown, the standard 1 has vertically slidable therein a rack 2 which is operated by means of the pawls 3 and 4 and the lever 5. The pawl 3 is pivoted at 6 on the lever 5, and the pawl 4 is pivoted at 7 within the lever casing 8. The lever 5 is pivoted in said casing at 9. The pawl-controlling spring 10 has its lower end bent and passed through an aperture in the pawl 4, and has its upper end passed through an aperture in the lug 11 on the pawl 3. Said spring also passes through an aperture in the lug 12 at the lower end of the reversing lever 13. Said lever 13 is fulcrumed at 14 in the casing 8, and has at its upper end a lug 15 projecting out of the casing through the slot 16. The lever 13 is made to fit tightly at its fulcrum 14 so that it will be held by friction either in the position shown in Fig. 2 or in that shown in Fig. 3. The lever 5 has a cam or shoulder 17 which bears against the pawl 4 when the reversing lever 13 is in the position shown in Fig. 3 causing the spring 10 to urge the pawl 4 free from the rack. The rack 2 has the middle part of its teeth indented or grooved at 18, as shown in Fig. 4, for permitting the cam 17 to move inwardly of the outer line of the teeth, as shown in Fig. 3.

At the upper part of the casing 8 is an inclined shoulder 19, which acts on the pawl 3 to urge the same into engagement with the rack when the reversing lever 13 is in the position shown in Fig. 3. When the reversing lever 13 is in the position shown in Fig. 2, the spring 10 serves to throw both pawls normally into engagement with the rack. The casing 1 is formed of two parts which are held together by means of the bolts 20, 21 and 7.

The operation of the device is as follows: When it is desired to lift the rack, the reversing lever 13, will be set by means of the projection 15 to the position shown in Fig. 2. The spring 10 now urges both of the pawls 3 and 4 normally into engagement with the teeth of the rack. The downward movement of the handle of the lever 5 lifts the pawl 3 and raises the rack, which is held in such raised position by means of the pawl 4. The raising of the handle of the lever 5 then drops the pawl 3 into engagement with a lower tooth of the rack 2. The rack is thereby further elevated when the lever handle is again lowered. When it is desired to lower the rack 2, the reversing lever 13 is swung to the position shown in Fig. 3 with its projection 15 at the left end of the slot 16, which slot is shown in Fig. 1. The spring 10 now urges both of the pawls 3 and 4 normally out of engagement with the teeth of the rack. The oscillation of the lever 5 now causes the pawls 3 and 4 to be alternately forced into engagement with the rack through respective contact with the shoulder 19 and cam 17. These surfaces are so arranged that in no position of the lever will both pawls be free from the rack. When the lever handle is lowered, the pawl 3 will be held in contact with the teeth of the rack by means of the inclined shoulder 19 while the spring 10 holds the pawl 4 out of engagement with the rack. When the handle of the lever 5 is now raised, the rack is permitted to descend, remaining in engagement with the pawl 3 through the pressure of its tooth thereon. When the handle of the lever 5 is raised a sufficient distance, the cam 17 will force the pawl 4 into engagement with one of the teeth on the rack. As soon as the rack rests upon the pawl 4, the further raising of the lever handle 5 lowers the pawl 3 so as to permit the spring 10 to release the same from the rack. The pawl 4 now supports the rack while the handle is again returned to the lowered position shown in Fig. 3, and the pawl 3 is thereby again lifted and forced into engagement with one of the teeth of the rack, through contact with the shoulder 19. As soon as the pressure of the cam 17 is released from the pawl 4, the spring 10 throws said pawl out of engagement with the teeth of the rack to the position shown in Fig. 3, thus permitting the rack to be again further lowered through the raising of the lever handle.

What I claim as my invention and desire to secure by Letters Patent is:

1. The combination of a frame, a rack movable thereon and having a groove extending through the teeth lengthwise of the rack, a pawl on the frame adapted for engagement with the rack, a lever fulcrumed on the frame and having a cam traveling into and out of said groove and adapted to bear against said pawl for urging the same into engagement with said rack.

2. The combination of a frame, a rack movable thereon and having a groove extending through the teeth lengthwise of the rack, a pawl on the frame adapted for engagement with the rack, a lever fulcrumed on the frame and having a cam traveling into and out of said groove and adapted to bear against said pawl for urging the same into engagement with said rack, and a second pawl carried by said lever and engaging said rack.

3. The combination of a frame, a rack movable thereon, a pawl on the frame adapted for engagement with the rack, a lever fulcrumed on the frame and having a cam intersecting the plane lying along the rack upon the face of the teeth, and adapted to follow the pawl across said plane to urge the pawl into engagement with the rack.

4. The combination of a frame, a rack movable thereon, a pawl on the frame and adapted for engagement with the rack, a lever fulcrumed on the frame and having a cam intersecting the plane lying along the rack upon the face of the teeth, and adapted to follow the pawl across said plane to urge the pawl into engagement with the rack, and a second pawl carried by said lever and engaging said rack.

Signed at Joliet Ill. this 15th day of June 1906.

ALFRED VAN FLEET.

Witnesses:
WM. GRINTON,
E. J. VAN FLEET.